May 2, 1967

H. F. JOHNSON 3,316,883

BIRD FEEDER

Filed Oct. 6, 1965

INVENTOR.
HOWARD F. JOHNSON

BY

*Nolte and Nolte*

ATTORNEYS

May 2, 1967  H. F. JOHNSON  3,316,883
BIRD FEEDER

Filed Oct. 6, 1965  2 Sheets-Sheet 2

INVENTOR.
HOWARD F. JOHNSON
BY
Nolte and Nolte
ATTORNEYS

United States Patent Office 3,316,883
Patented May 2, 1967

3,316,883
BIRD FEEDER
Howard F. Johnson, New Lebanon, N.Y. 12125
Filed Oct. 6, 1965, Ser. No. 502,808
6 Claims. (Cl. 119—51)

This invention relates to a bird feeder and in particular to a feeder for the feeding of smaller birds and this application is a continuation-in-part of abandoned application Ser. No. 479,510, filed Aug. 13, 1965, and entitled, Bird Feeder.

Many people, in their desire to feed birds during the colder months, place bird feeders outside their homes in which bird seed is periodically placed. However, it has been found that larger birds such as bluejays and starlings often gather at these feeding areas and chase away the smaller birds such as chickadees, nuthatchers and woodpeckers.

These larger birds, as well as animals such as squirrels, congregate on the roof or top of such feeders and frighten away the smaller birds, who therefore must find other means of sustenance during the colder months.

It is therefore an object to provide a bird feeder in which the smaller birds can enter to find food and in which larger birds and woodland animals are unable to congregate around, so that the smaller birds have unhindered access to the feeder without fear of obstruction from the larger animals.

It is another object of this invention to provide a bird feeder in which smaller birds can enter with ease while the food within is kept from the reach of larger birds.

It is yet another object of this invention to provide a bird feeder which is readily assembled for use.

It is another object of this invention to provide a bird feeder which is assembled without the use of hinges, hooks or pins or similar fastening means which permits for greater ease and lower cost in manufacture.

It is yet another object of this invention to provide a bird feeder which, once assembled, can be readily disassembled so that the supply of bird feed can be replenished.

A feature of this invention is the provision of a roof having a steep angle into which the feeder proper telescopically fits. The feeder is provided with holes of a predetermined diameter which are located on the front vertical face of the feeder through which the smaller birds can readily fly through whereas the larger birds, due to the restriction of the hole diameter, cannot. The slope of the roof is of a sufficiently steep angle, so that if a larger bird or a squirrel would attempt to perch on the roof, he would slide off due to the steepness of the angle.

Another feature of the bird feeder, which is the subject of this application, is that the eave of the roof is made to extend over the front wall of the feeder, so that the extending eave prevents a larger bird from flying towards the hole in an attempt to remove food from the feeder by inserting its beak through the aforementioned holes on the front wall of the feeder.

Further objects and features of this invention will become more apparent from a study of the specification, as studied in conjunction with the appended figures in which.

Figure 1:
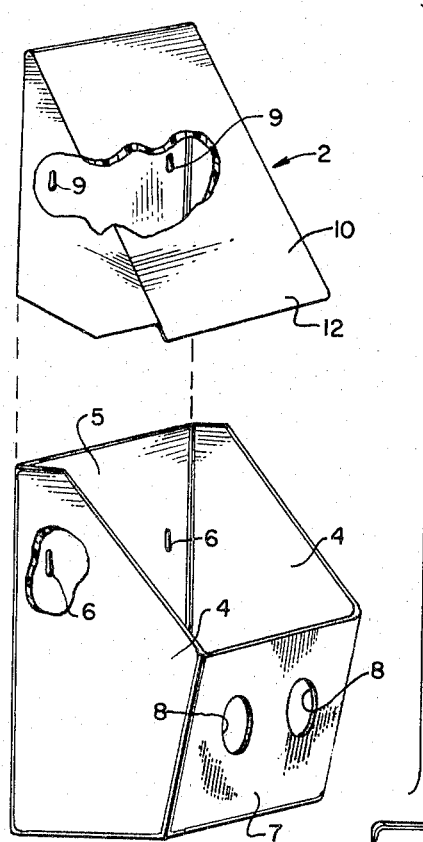
FIG. 1 is an exploded view of the sections of the bird feeder according to this invention.

As shown in FIG. 1, the bird feeder consists of two sections, the feed holder 1 and the sloped roof portion 2. The feed holder 1 is a hollow rectangular body in which the side portions 4 slope downwardly from the back side 5 to the front side 7 thereof. The back side 5 contains two slots 6 disposed at the upper portion and the front portion 7 contains two holes 8 which are of a diameter which is sufficient to allow the small birds to pass therethrough to gain access to the bird food within the feeder, but which prevent larger birds from entering the feeder through these holes. The roof portion 2 is adapted to fit snugly over the top of the feeder portion in that its width is slightly greater than the width of the feeder portion. Due to the snugness of the fit between the roof portion and the feeder portion, the frictional force therebetween retains the two portions to one another. This retention is thus seen to be achieved without the need of any mechanical fasteners such as hooks, hinges, or pins.

Figure 2:
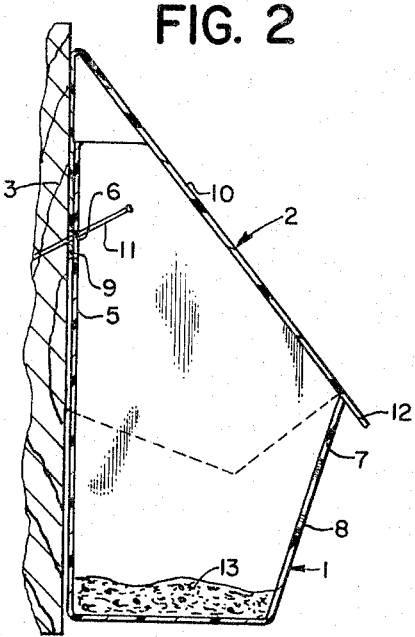
FIG. 2 is a side elevation, in cross section, of the bird feeder shown in FIG. 1, showing the means for mounting the bird feeder.

The roof consists of a four-sided body which, as shown in FIG. 2, is substantially a right triangle in cross section. On the rear portion of the roof there are two slots 9 which, when the roof portion is slid over the top portion of the feeder 2, coincide with the slots 6 in the back side of the feeder. The angle of the slope of the surface 10 is designed to be sufficiently large so that larger birds or animals will not be able to perch thereon, as the gravitational force exerted on the bird or animal will cause the bird or animal to slide off the roof surface. The roof is made from a material, such as sheet metal, which has a low coefficient of friction. As a result of the combination of the steep roof angle and the low coefficient of friction, the larger birds or animals, which would tend to perch on the roof of the feeder and thus frighten away the smaller birds, would quickly lose their footing and slide off the roof.

The eave 12 of the roof extends over the front side 7 of the feeder as shown in FIG. 2, so that the larger birds are prevented from sticking their beaks into the food holder through the holes 8. Once the larger birds are thwarted in their efforts to reach the food within the feeder they will quickly disperse from the area, providing the smaller birds with a ready access to the food within the feeder.

The combined feeder is mounted to any convenient location 3, such as the side of a house, garage or to a tree, by merely placing upwardly extending pins 11 in the mounting location. To construct the feeder, the roof portion is slid snugly over the feeder until the slots 10 and 6 are in registry with one another. The combination of the roof and feeder is then mounted by placing the slots over the pins, thereby holding the feeder to the mounting location.

To add bird feed 13 into the feeder portion, the combination of the roof and feeder is lifted off the pins, and the roof section is pulled upwards and away from the feeder. Once sufficient amount of food is in the feeder the process is reversed in that once again the roof is placed over the feeder and the combination of the two is once again placed over the pins.

Figure 4:
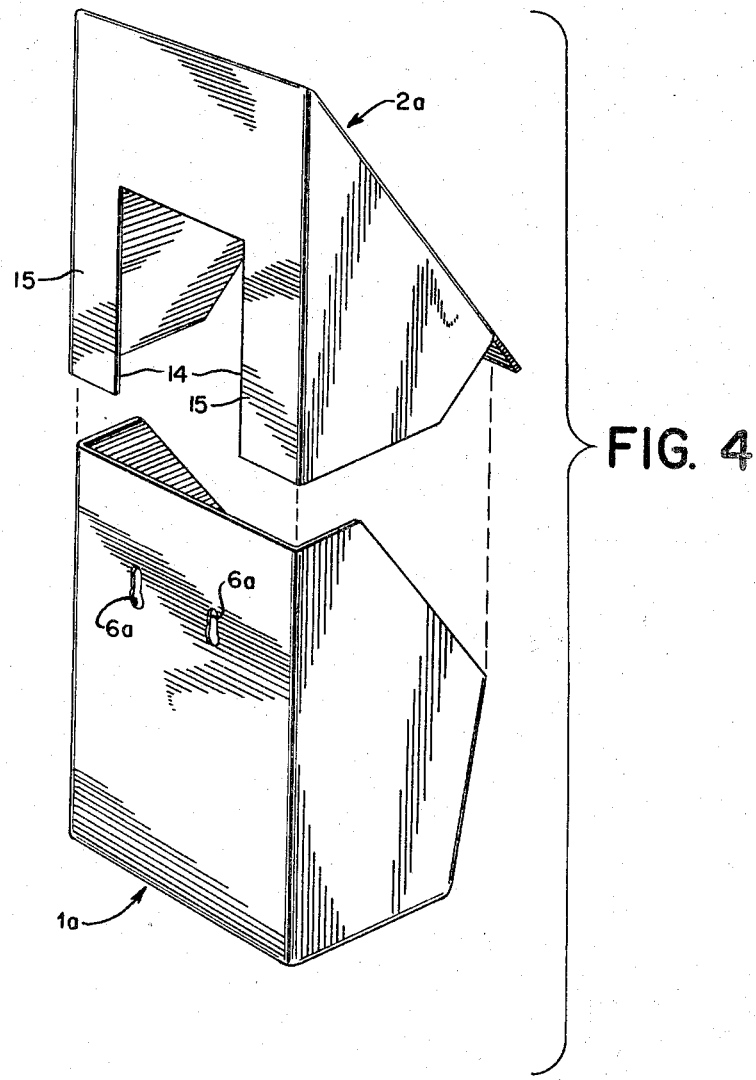
FIG. 4 is an exploded view, partly in section, of the sections of another embodiment of a bird feeder according to this invention.

Another embodiment of a bird feeder is shown in FIG. 4, which permits the addition of bird food without the necessity of removing the feed holder 1a from its mounting.

All that is required in this embodiment is that the sloped roof portion 2a be lifted from the feed holder 1a. The feed holder 1a therefore remains permanently secured to the mounting.

Figure 3:
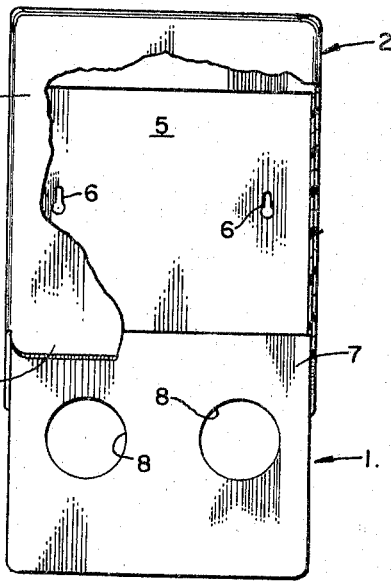
FIG. 3 is a front elevation view, partly in section, of the bird feeder according to this invention.

To achieve this improved feature in a bird feeder the roof portion 2a is modified from the embodiment shown in FIGS. 1-3, in that a slot 14 is provided in the rear wall 15 of the roof portion 2a as shown in FIG. 4.

The construction of the feed holder 1a remains identical to that shown in the previously described embodiment.

Slot 14 is centered within rear wall 15 and the width thereof is dimensioned to exceed the distance between the slots 6a within the feed holder 1a. The height of slot 14 is dimensioned, so that when the roof portion is slid over the feed holder and placed in the desired position, the top edge of the slot does not interfere with the mounting means which extend through the slots 6a.

To replace the food within the feed holder, or to merely clean the feed holder, all that is now necessary is the lifting of the sloped roof portion 2a from the feed holder 1a to overcome the frictional retention force therebetween. The feed holder 1a remains mounted to the mounting situs by means, such as the nails shown in FIG. 3, and is then either refilled or cleaned as desired. When the operation is completed the roof section is remounted in position over the feed holder.

It is obvious that many variations can be made to the basic inventive principles disclosed here so that this invention should be limited solely by the claims which are appended hereto.

What is claimed is:

1. A bird feeder comprising a feeder portion having an open top end, a bottom wall, an exterior, substantially vertical side surface, and a front wall, a roof portion slidable over said feeder portion and having an open bottom, a closed top end, an interior substantially vertical side surface, and a front wall slanting at a relatively sharp angle and extending in front of and downwardly beyond a top edge of said front wall of said feeder portion wherein the width of said roof portion exceeds slightly the width of said feeder portion and said roof portion having a snug fit on said feeder portion with said exterior vertical surface of the latter frictionally engaging the interior vertical surface of said roof portion and said frictional engagement between said vertical surfaces forming the only connection between said feeder and roof portions.

2. A bird feeder as recited in claim 1, wherein the outer surface of the slanting front wall of said roof portion is made of a material having a relatively low coefficient of friction.

3. A bird feeder as recited in claim 1, wherein said feeder portion is formed at said front wall thereof in the immediate vicinity of that portion of said front wall of said roof portion which extends downwardly beyond said top edge of said front wall of said feeder portion with a plurality of apertures of a sufficiently small size to permit smaller birds to enter while restricting entrance therethrough of larger birds.

4. A bird feeder as recited in claim 1, wherein said feeder and roof portions include rear walls having holes in registry with each other when said roof portion is placed over said feeder portion, said holes being adapted to be placed over pin means which extend from a mounting location.

5. A bird feeder as recited in claim 1, wherein said roof portion has a rear wall formed with a notch extending upwardly from a lower edge thereof, and said feeder portion having a rear wall formed with at least one hole therein for receiving mounting means therethrough, said hole of said rear wall of said feeder portion being situated within said notch of said rear wall of said roof portion so that without removing said mounting means from said hole said roof portion can be slipped upwardly away from said feeder portion to be separated therefrom.

6. A bird feeder comprising an open feeder portion comprising a front and back wall, said front wall being formed with at least one aperture therein dimensioned to prevent large birds from entering into said feeder portion, and said rear wall having at least one aperture therein, and a roof portion comprising a top and rear wall, said top wall sloping downwards and being made of a low friction material, said rear wall being formed with a notch extending upwardly from a lower edge thereof, the width of said roof portion being slightly greater than the width of said feeder portion, permitting said roof portion to be fitted over said feeder portion with said aperture at said rear wall of said feeder portion situated within said notch in said rear wall of said roof portion, and said feeder portion having an exterior substantially vertical surface while said roof portion has an interior substantially vertical, surface, said exterior and interior surfaces frictionally engaging each other when said roof portion is on said feeder portion providing a sliding, snug fit therebetween and forming the only structure which retains said feeder portion and roof portion assembled with each other.

References Cited by the Examiner

UNITED STATES PATENTS

| | | | |
|---|---|---|---|
| 1,169,409 | 1/1916 | Larson | 119—23 |
| 2,260,018 | 10/1944 | Garthus | 119—23 |
| 3,087,460 | 4/1963 | Stone | 119—23 |
| 3,115,865 | 12/1963 | Parkes et al. | 19—52 |
| 3,182,635 | 5/1965 | Waite | 119—51 |

FOREIGN PATENTS

| | | |
|---|---|---|
| 737,961 | 7/1943 | Germany. |
| 243,897 | 12/1965 | Great Britain. |
| 383,063 | 12/1964 | Switzerland. |

SAMUEL KOREN, *Primary Examiner.*

ALDRICH F. MEDBERY, *Examiner.*